United States Patent
Roh et al.

(10) Patent No.: US 9,800,294 B2
(45) Date of Patent: Oct. 24, 2017

(54) NFC ANTENNA MODULE AND NFC MODULE INCLUDING THE SAME

(71) Applicant: SAMSUNG ELECTRONICS CO., LTD., Suwon-si, Gyeonggi-Do (KR)

(72) Inventors: Hyoung-Hwan Roh, Seoul (KR); Il-Jong Song, Suwon-si (KR); Yo-Han Jang, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 21 days.

(21) Appl. No.: 14/580,322

(22) Filed: Dec. 23, 2014

(65) Prior Publication Data

US 2015/0180548 A1 Jun. 25, 2015

(30) Foreign Application Priority Data

Dec. 23, 2013 (KR) .................. 10-2013-0161779

(51) Int. Cl.
*H04B 5/00* (2006.01)
*H04B 5/02* (2006.01)

(52) U.S. Cl.
CPC ......... *H04B 5/0031* (2013.01); *H04B 5/0081* (2013.01); *H04B 5/02* (2013.01)

(58) Field of Classification Search
CPC .. H04B 5/0031; H04B 5/0081; H04B 5/0087; H04B 5/0093; H04B 5/02
USPC ...................................................... 455/41.1
See application file for complete search history.

(56) References Cited

U.S. PATENT DOCUMENTS

| | | | |
|---|---|---|---|
| 6,166,706 A | 12/2000 | Gallagher, III et al. | |
| 8,400,271 B2 | 3/2013 | Sadr | |
| 9,160,196 B2* | 10/2015 | Endo | H02J 7/025 |
| 2007/0001906 A1 | 1/2007 | Pelzer et al. | |
| 2007/0155443 A1* | 7/2007 | Cheon | H04B 1/3805 |
| | | | 455/572 |
| 2010/0258639 A1 | 10/2010 | Florek et al. | |
| 2012/0075148 A1* | 3/2012 | Cho | G06K 19/0723 |
| | | | 343/702 |
| 2012/0168517 A1* | 7/2012 | Lee | H01Q 1/243 |
| | | | 235/492 |
| 2012/0206242 A1 | 8/2012 | Cho | |
| 2012/0315844 A1 | 12/2012 | Cox et al. | |
| 2013/0017782 A1 | 1/2013 | Tay et al. | |
| 2013/0062418 A1 | 3/2013 | Weakley | |
| 2013/0064271 A1 | 3/2013 | Van De Beek et al. | |
| 2013/0130757 A1* | 5/2013 | Luo | H04B 5/00 |
| | | | 455/575.7 |

(Continued)

FOREIGN PATENT DOCUMENTS

JP 2008205557 9/2008
KR 1020050014423 A 2/2005
(Continued)

*Primary Examiner* — Nay A Maung
*Assistant Examiner* — Angelica M Perez
(74) *Attorney, Agent, or Firm* — Volentine & Whitt, PLLC (57) ABSTRACT

A resonance frequency of a near field communication (NFC) antenna module may be set to be equal to a first frequency by a resonance unit included in the NFC antenna module. The NFC module may include a matching circuit connected to the NFC antenna module. The matching circuit may include terminals exposed to the outside such that the antenna module is detachable from the matching circuit.

20 Claims, 8 Drawing Sheets

(56) References Cited

U.S. PATENT DOCUMENTS

2013/0207852 A1* 8/2013 Nakano .................. H01Q 1/243
  343/702
2013/0234658 A1* 9/2013 Endo ....................... H02J 7/025
  320/108
2014/0154980 A1   6/2014 Jang et al.

FOREIGN PATENT DOCUMENTS

| KR | 1020050078664 A | 8/2005 |
| KR | 1020060012621 A | 2/2006 |
| KR | 200440404 | 6/2008 |
| KR | 1020110079806 | 7/2011 |
| KR | 1020140072643 A | 6/2014 |

* cited by examiner

NFC ANTENNA MODULE AND NFC MODULE INCLUDING THE SAME

CROSS-REFERENCE TO RELATED APPLICATIONS

A claim of priority is made Korean Patent Application No. 10-2013-0161779, filed on Dec. 23, 2013, in the Korean Intellectual Property Office, the disclosure of which is incorporated herein in its entirety by reference.

BACKGROUND

The inventive concept relates to a near field communication (NFC) antenna module and an NFC module including the same, and more particularly, to an NFC antenna module capable of wirelessly transmitting and/or receiving data based on a magnetic field and an NFC module including the same.

NFC is a technology whereby data can be wirelessly transmitted or received within a relatively near distance of about 10 cm or less. For example, NFC may be used as means of paying for a product that a consumer wishes to purchase or as means of transmitting data between mobile communication devices. In NFC standards, e.g., ISO/IEC 21481, communication protocols, data exchange formats, etc. are defined and a frequency of 13.56 MHz is used.

Communication devices, such as mobile phones and laptop computers, which support NFC, may include an antenna for NFC, a modulator that modulates a signal to be transmitted via the antenna, and a demodulator that demodulates a signal received via the antenna. The antenna may be connected to the modulator and the demodulator via passive devices and installed on an inner side surface of a case of a communication device so that the communication device may establish wireless communication with another communication device based on a magnetic field generated by the antenna.

SUMMARY

The inventive concept provides a near field communication (NFC) antenna module and an NFC module including the same, and more particularly, an NFC antenna module using a resonance frequency as a first frequency and an NFC module including the same.

According to an aspect of the inventive concept, there is provided a near field communication antenna (NFC) module including a first terminal, a second terminal, an antenna connected to the first and second terminals, and a resonance unit. The resonance unit is connected to the first and second terminals and includes a first passive device, the value of which is determined such that a resonance frequency between the first and second terminals is equal to a first frequency.

In one embodiment, the first passive device may be a capacitor having a capacitance determined based on the first frequency and an inductance of the antenna.

In one embodiment, the NFC antenna module may be connected to an external matching circuit via the first and second terminals, and the first and second terminals may be exposed to the outside such that the NFC antenna module is detachable from the matching circuit.

In one embodiment, the NFC antenna module may be installed in a battery of a mobile communication device and may use two terminals among terminals of the battery as the first and second terminals.

In one embodiment, the NFC antenna module may be installed on a battery cover of the mobile communication device.

In one embodiment, the NFC antenna module may further include a flexible printed circuit board, and the antenna and the first passive device may be mounted on the flexible printed circuit board.

In one embodiment, the first frequency may be in the range of 13 MHz to 14 MHz.

According to another aspect of the inventive concept, there is provided a near field communication (NFC) module including a matching circuit and an NFC controller. The matching circuit is connected to an antenna module that resonates at a first frequency and includes a plurality of passive devices. The NFC controller is connected to the matching circuit, and configured to output or receive a signal of a second frequency. The first frequency is determined regardless of the plurality of passive devices.

In one embodiment, values of the plurality of passive devices may be determined based on an impedance at the first frequency.

In one embodiment, the matching circuit may include at least one terminal that contacts the antenna module. The at least one terminal may be exposed to the outside such that the antenna module is detachable from the NFC module.

In one embodiment, the NFC controller may include a secure element that stores data related to payment information and transmitted via the antenna module.

In one embodiment, the matching circuit may include a semiconductor chip package, and the semiconductor chip package may encapsulate the plurality of passive devices.

In one embodiment, the second frequency may be 13.56 MHz, and the first frequency may be in the range of 13 MHz to 14 MHz.

In one embodiment, the antenna module may be included in the NFC module and include an antenna and a resonance unit. The resonance unit may include a first passive device, the value of which is determined such that a resonance frequency of the antenna module is equal to the first frequency.

In one embodiment, the first passive device may be a capacitor having a capacitance determined based on the first frequency and an inductance of the antenna.

BRIEF DESCRIPTION OF THE DRAWINGS

Exemplary embodiments of the inventive concept will be more clearly understood from the detailed description that follows, taken in conjunction with the accompanying drawings, in which.

DETAILED DESCRIPTION OF THE EMBODIMENTS

Hereinafter, exemplary embodiments of the inventive concept will be described in greater detail with reference to the accompanying drawings. The inventive concept may, however, be embodied in many different forms and should not be construed as being limited to the embodiments set forth herein. Rather, these embodiments are provided so that this disclosure will be thorough and complete and will fully convey the inventive concept to those of ordinary skill in the art.

As used herein, the term "and/or" includes any and all combinations of one or more of the associated listed items. Also, as is traditional in the field of the inventive concept, embodiments may be described in terms of function blocks, units and/or modules. It will be understood that these blocks, units and/or modules are physically implemented by electronics circuits, and that such circuits may be operate under hardware control, software control, or a combination thereof.

Figure 1:
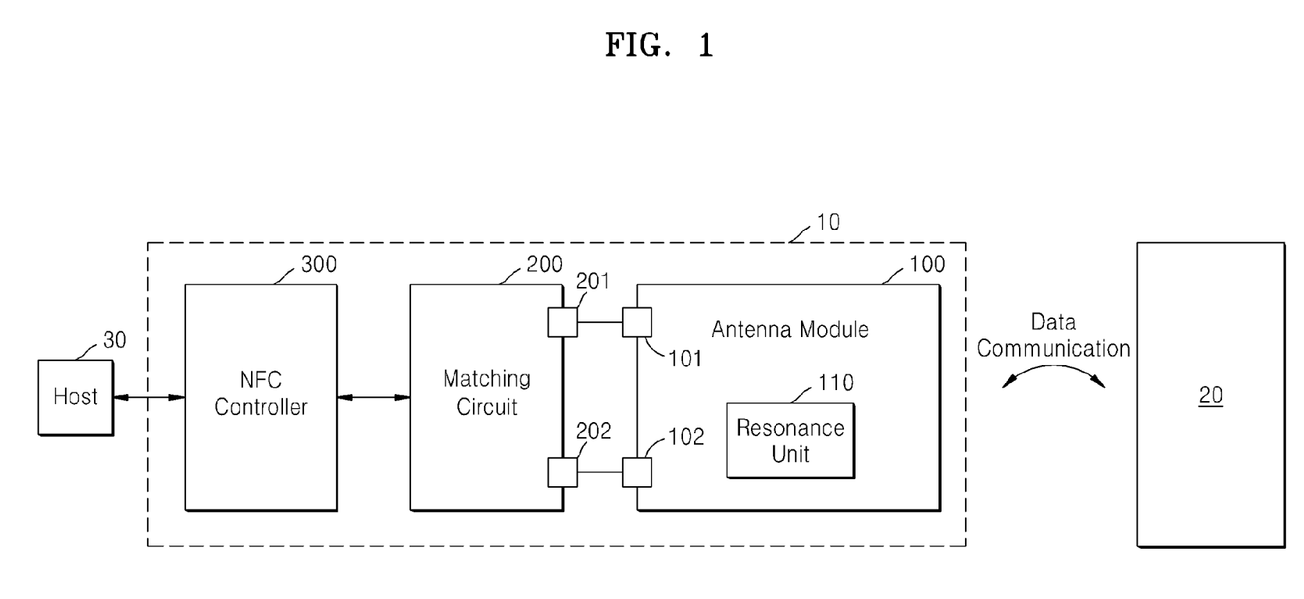
FIG. 1 is a block diagram of a near field communication (NFC) module according to an exemplary embodiment of the inventive concept.

FIG. 1 is a block diagram of a near field communication (NFC) module 10 according to an embodiment of the inventive concept. The NFC module 10 is capable of exchanging data with a communication device 20 in a wireless manner and communicating with a host 30. The NFC module 10 may transmit a signal to the communication device 20 based on data received from the host 30, or transmit data to the host 30 based on a signal received from the communication device 20. The host 30 may be a controller included in a communication device including the NFC module 10, e.g., a general-purpose processor, an application processor, a system-on-chip (SOC), etc. The host 30 may communicate with the communication device 20 supporting NFC via the NFC module 10. The communication device 20 may also include the NFC module 10 of FIG. 1 to transmit or receive data through NFC.

According to an embodiment of the inventive concept, the NFC module 10 may include an antenna module 100, a matching circuit 200, and an NFC controller 300. The antenna module 100, which may be also referred to as an NFC antenna module, may generate a magnetic field according to a received signal or generate a signal according to a magnetic field generated from the outside. As illustrated in FIG. 1, the antenna module 100 may include a first terminal 101, a second terminal 102, and a resonance unit 110. The antenna module 100 may be connected to the matching circuit 200 via the first terminal 101 and the second terminal 102. A signal that is to be transmitted from the antenna module 100 or a signal that is based on a magnetic field and received by the antenna module 100 may be transmitted via the first terminal 101 and the second terminal 102.

The resonance unit 110 included in the antenna module 100 may determine a resonance frequency of the antenna module 100. The antenna module 100 may be designed to have a frequency, which is approximately 13.56 MHz according to the NFC standards, as a resonance frequency so as to increase the efficiency of wireless communication. That is, a resonance frequency between the first terminal 101 and the second terminal 102 may approximately be 13.56 MHz. For example, the resonance unit 110 may set a first frequency, which is the resonance frequency of the antenna module 100, to be in the range of 13 MHz to 14 MHz. The resonance unit 110 will be described in detail below.

As illustrated in FIG. 1, the matching circuit 200 may exchange a signal with the NFC controller 300. The matching circuit 200 may include terminals 201 and 202 that are electrically connected to the first terminal 101 and the second terminal 102, respectively, and may exchange a signal with the antenna module 100. The matching circuit 200 may include at least one passive device, e.g., a resistor, a capacitor, an inductor, etc, and change an impedance between the NFC controller 300 and the antenna module 100. For example, the matching circuit 200 may be connected to the NFC controller 300 via a plurality of conducting wires. The arrangement and characteristic values (e.g., a capacitance, a resistance, an inductance, etc.) of the at least one passive device included in the matching circuit 200 may be determined so that a signal to be transmitted via the first terminal 101 or the second terminal 102 may be transmitted via the plurality of conducting wires without distortion.

The NFC controller 300 may control an operation of the NFC module 10 and communicate with the host 30 outside the NFC module 10. For example, the NFC controller 300 may receive data by communicating with the host 30 and output a signal obtained by modulating the received data to the matching circuit 200. Also, the NFC controller 300 may transmit data obtained by demodulating a signal received via the matching circuit 200 to the host 30. The NFC controller 300 may be embodied as a semiconductor device and may be also referred to as an NFC chip. According to an embodiment of the inventive concept, the NFC controller 300 may include a security element (SE) that stores data related to payment information and identification information about a user. The NFC controller 300 may output and receive a signal at a second frequency. According to the NFC standards, the second frequency may be 13.56 MHz.

Although FIG. 1 illustrates an embodiment in which the NFC module 10 establishes wireless communication with the communication device 20, NFC may support peer-to-peer (P2P) communication but also a reader/tag operation and card emulation, and thus, the NFC module 10 according to an embodiment of the inventive concept is applicable to an application that enables wireless communication to be established between the communication device 20 and another external object according to an operation supported by NFC.

Figure 2:
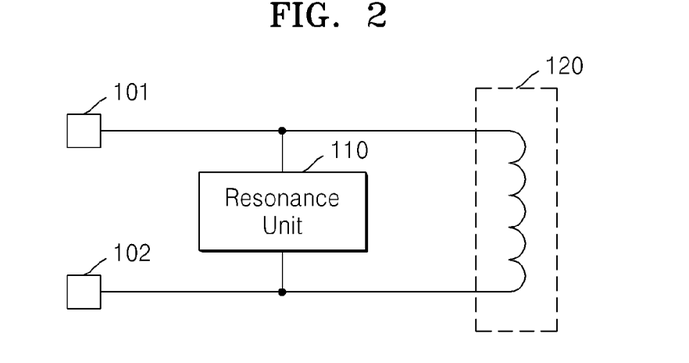
FIG. 2 is a diagram illustrating an application example of an antenna module according to an embodiment of the inventive concept.

FIG. 2 is a diagram illustrating an application example of an antenna module 100 according to an embodiment of the inventive concept. Referring to FIG. 1, the antenna module 100 is of an integral type and is capable of being separated from the matching circuit 200. For example, the antenna module 100 may be connected to the matching circuit 200 by connecting a communication device or a substrate on which the matching circuit 200 and the NFC controller 300 are installed to the first terminal 101 and the second terminal 102. According to an embodiment of the inventive concept, the antenna module 100 is detachable from the matching circuit 200.

As illustrated in FIG. 2, the antenna module 100 may include a first terminal 101 and a second terminal 102 that are exposed to the outside thereof. The antenna module 100 may further include a resonance unit 110 and an antenna 120 connected to the first terminal 101 and the second terminal 102. The antenna 120 may generate a magnetic field according to a signal received from the matching circuit 200 by using the first terminal 101 and the second terminal 102. A signal may be wirelessly transmitted using the generated magnetic field. According to an embodiment of the inventive concept, the antenna 120 may be a coil that generates a magnetic field from electric current flowing there through, and may have a specific inductance. The inductance of the antenna 120 may vary according to the shape of the coil. The shape of the coil may be determined by space in which the antenna 120 is installed.

As illustrated in FIG. 2, the resonance unit 110 may be connected to the first terminal 101 and the second terminal 102, and be thus also connected to the antenna 120. As described above with reference to FIG. 1, the resonance unit 110 may determine a resonance frequency of the antenna module 100. For example, the resonance unit 110 may be designed such that the resonance frequency of the antenna module 100 is equal to a first frequency, based on the inductance of the antenna 120. The resonance unit 110 may include at least one passive device. The at least one passive device included in the resonance unit 110 may be connected in parallel to the antenna 120.

According to an embodiment of the inventive concept, the resonance frequency of the antenna module 100 may be set to be the first frequency, e.g., 14 MHz. That is, the resonance frequency of the antenna module 100 may be set independently from the matching circuit 200 to which the antenna module 100 is connected via the first terminal 101 and the second terminal 102. The antenna module 100 includes not only the antenna 120 but also the resonance unit 110, and may resonate at the first frequency. If the antenna module 120 includes only the antenna 120 and the matching circuit 200 includes the resonance unit 110, the matching circuit 200 may be re-designed whenever the shape of the antenna 120 of the antenna module 120 is changed. According to an embodiment of the inventive concept, the matching circuit 200 connected to the antenna module 120 may be designed independently in consideration of the first frequency which is equal to the resonance frequency of the antenna module 100 without considering the shape of the antenna 120 that varies according to space in which the antenna module 100 is installed (i.e., without considering the inductance of the antenna 120).

Figure 3A:
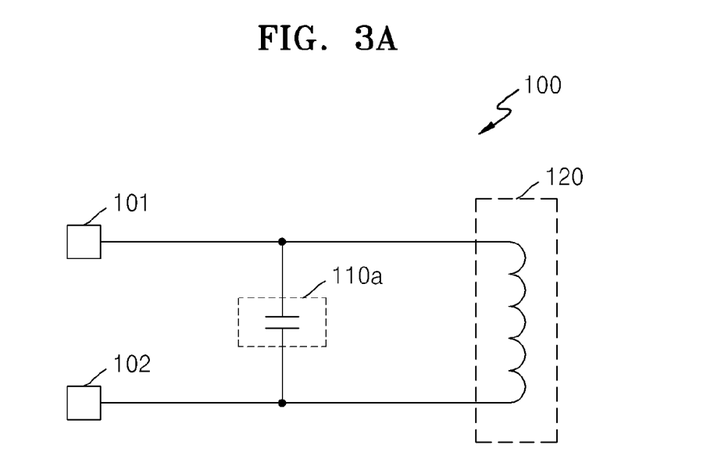
FIGS. 3A and 3B are diagrams illustrating application examples of a resonance unit according to embodiments of the inventive concept.
Figure 3B:
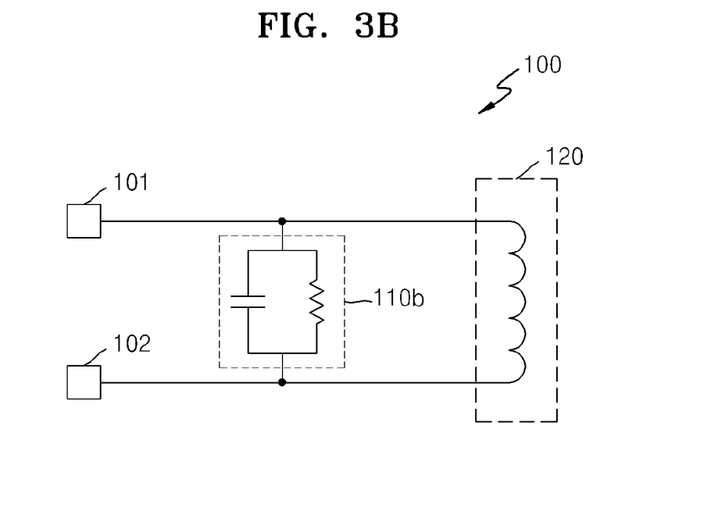

FIGS. 3A and 3B are diagrams illustrating application examples of the resonance unit 110 according to embodiments of the inventive concept. Referring to FIG. 2, the resonance unit 110 may be connected to the first terminal 101 and the second terminal 102, and connected to the antenna 120. The resonance unit 110 may include the at least one passive device, and the resonance frequency of the antenna module 100 may be determined by the arrangement and value of the at least one passive device and the antenna 120 (or an inductance of the antenna 120). In other words, the arrangement and characteristic value of the at least one passive device included in the resonance unit 110 may be determined according to the first frequency, which is the resonance frequency of the antenna module 100.

FIG. 3A illustrates a resonance unit 110a including a capacitor according to an embodiment of the inventive concept. As illustrated in FIG. 3A, the resonance unit 110a may include a capacitor. The capacitor may be connected to a first terminal 101 and a second terminal 102 and connected in parallel to the antenna 120. In the embodiment of FIG. 3A, a resonance frequency f of an antenna module 100 may be calculated by Equation 1 below, based on a capacitance C of the capacitor and an inductance L of the antenna 120.

$$F=\{2\pi(LC)^{1/2}\}^{-1} \qquad \text{Equation 1}$$

The inductance L of the antenna 120 is determined by the shape of the antenna 120, and thus, the capacitance C of the capacitor may be controlled such that the antenna module 100 has a resonance frequency that is approximately 13.56 MHz which is a standard NFC frequency. For example, if the first frequency that is the resonance frequency f of the antenna module 120 is 14 MHz and the inductance L of the antenna 120 is 10 μH, the capacitance C of the capacitor included in the resonance unit 110a may be calculated to be about 13 pF according to Equation 1 above. When the antenna module 100 includes the antenna 120 having the inductance L of 15 μH, the capacitance C of the capacitor included in the resonance unit 110a may be calculated to be about 8.6 pF according to Equation 1 above. As described above, the capacitance C of the capacitor included in the resonance unit 110a may be determined by the first frequency and the inductance L of the antenna 120. In other words, the resonance unit 110a may set the resonance frequency of the antenna module 100 to be the first frequency by controlling the capacitance C of the capacitor, in consideration of the given inductance L of the antenna 120.

FIG. 3B illustrates a resonance unit 110b including a capacitor and a resistor according to another embodiment of the inventive concept. As illustrated in FIG. 3B, the resonance unit 110b may include the capacitor and the resistor connected in parallel, and the capacitor and the resistor may be connected to a first terminal 101 and a second terminal 102, respectively. Thus, an antenna module 100 may be equivalent to a circuit in which a capacitor, a resistor, and an inductor (i.e., the antenna 120) are connected in parallel. In the embodiment of FIG. 3B, a resonance frequency f of the antenna module 100 may be calculated by Equation 1 above, based on a capacitance of the capacitor C and an inductance L of an antenna 120, similar to the embodiment of FIG. 3A. When the antenna module 100 is operated at a resonance frequency according to a signal of the resonance frequency that is supplied to the first terminal 101 and the second terminal 102, an impedance (or admittance) between the first terminal 101 and the second terminal 102 may be determined by a resistance value R of the resistor.

Figure 4:
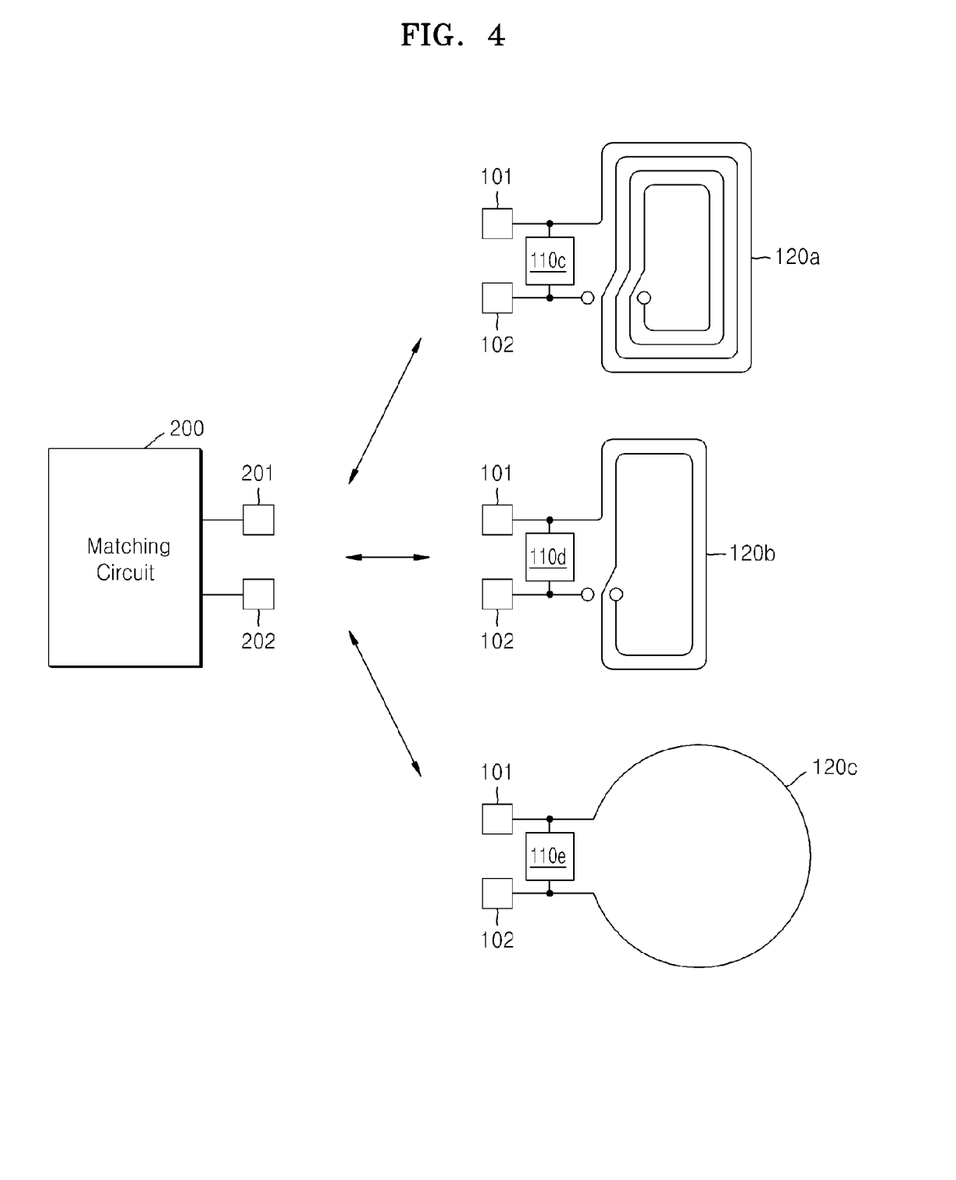
FIG. 4 is a diagram illustrating application examples of an antenna module according to other embodiments of the inventive concept.

FIG. 4 is a diagram illustrating application examples of the antenna module 100 according to other embodiments of the inventive concept. The shape of the antenna 120 included in the antenna module 100 may be determined by not only space in which the antenna 120 is installed but also a required inductance of the antenna 120. Based on the resultant inductance of the antenna 120, the arrangement and value of at least one passive device included in the resonance unit 110 may be determined such that a resonance frequency of the antenna module 100 is equal to a first frequency. According to an embodiment of the inventive concept, the antenna 120 may be a dual loop antenna manufactured by adding a single coil antenna or two loop antennae to have the same cross-section to form a strong magnetic field using the magnetic resonance phenomenon.

As illustrated in FIG. 4, antennae 120a to 120c having various shapes may be connected to terminals 201 and 202 of a matching circuit 200 via a first terminal 101 and a second terminal 102. Resonance units 110c to 110e designed according to the shapes of the antennae 120a to 120c may be connected to the antennae 120a to 120c, respectively. The resonance units 110c to 110e may be designed such that a resonance frequency between the first terminal 101 and the second terminal 102 is equal to the first frequency. For example, the capacitances of capacitors respectively included in the resonance units 110c to 110e may be adjusted so that the resonance frequency between the first terminal 101 and the second terminal 102 may be equal to the first frequency. Thus, the matching circuit 200 may be designed independently from the shapes of the antennae 120a to 120c and be compatible with the antenna module 100 of FIG. 1 having a resonance frequency that is equal to the first frequency.

Figure 5:
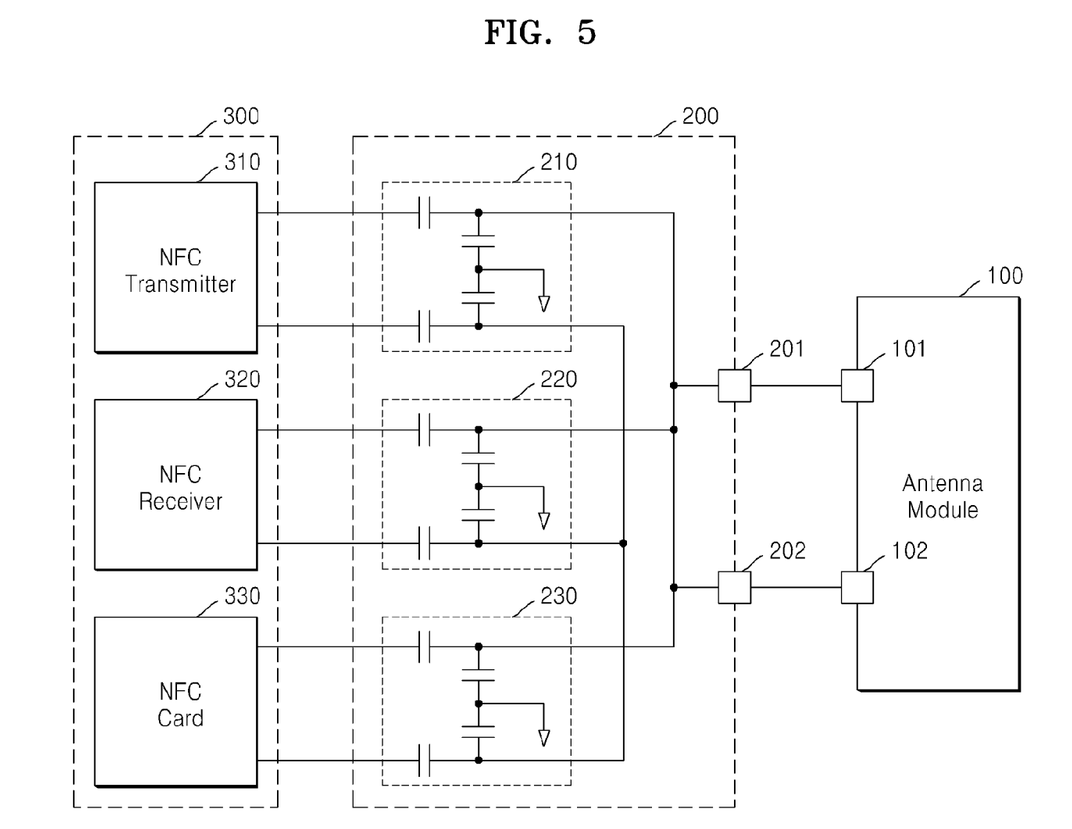
FIG. 5 is a block diagram of a matching circuit and an NFC controller of FIG. 1 according to an embodiment of the inventive concept.

FIG. 5 is a block diagram of the matching circuit 200 and the NFC controller 300 of FIG. 1 according to an embodiment of the inventive concept. Referring to FIGS. 1 and 5, the matching circuit 200 may be connected to the antenna module 100 via the terminals 201 and 202 connected to the first terminal 101 and the second terminal 102 of the antenna module 100, respectively, and connected to the NFC controller 300 via a plurality of conducting wires. The matching circuit 200 may change an impedance between the NFC controller 300 and the antenna module 100, and transmit a signal between the NFC controller 300 and the antenna module 100. The NFC controller 300 may output a signal to the matching circuit 200, receive a signal from the matching circuit 200, and communicate with the host 30 outside the NFC module 10.

As illustrated in FIG. 5, the matching circuit 200 may include a transmitter interface 210, a receiver interface 220, and a card interface 230. Each of the transmitter interface 210, the receiver interface 220, and the card interface 230 may be connected to the first terminal 101 and the second terminal 102 of the antenna module 100, and output or receive a signal via the first terminal 101 or the second terminal 102. As illustrated in FIG. 5, the transmitter interface 210, the receiver interface 220, and the card interface 230 may be connected to an NFC transmitter 310, an NFC receiver 320, and an NFC card 330 included in the NFC controller 300, respectively.

The antenna module 100 operating at a resonance frequency may have a high impedance. To increase the intensity of a magnetic field generated via the antenna 120 of the antenna module 100, the NFC controller 300 may output high electric current. To this end, the matching circuit 200 connected to the NFC controller 300 may have a low input impedance. Thus, the matching circuit 200 may have a function of changing an impedance between the NFC controller 300 and the antenna module 100.

Each of the transmitter interface 210, the receiver interface 220, and the card interface 230 included in the matching circuit 200 may include at least one passive device, e.g., a resistor, a capacitor, an inductor, etc. For example, as illustrated in FIG. 5, the transmitter interface 210, the receiver interface 220, and the card interface 230 may each include at least one capacitor. FIG. 5 illustrates an embodiment in which the transmitter interface 210, the receiver interface 220, and the card interface 230 each include only the at least one capacitor, but embodiments of the inventive concept are not limited thereto.

As described above with reference to FIG. 4, the resonance frequency of the antenna module 100 is set to be a first frequency by the resonance unit 110 included in the antenna module 100. Thus, the transmitter interface 210, the receiver interface 220, and the card interface 230 included in the matching circuit 200 may be designed independently from the antenna module 100. That is, the arrangement and value of at least one passive device included in each of the transmitter interface 210, the receiver interface 220, and the card interface 230 may be designed independently from the antenna module 100. Since the NFC module 10 establishes wireless communication using the antenna module 100 that resonates at the first frequency, the arrangement and value of at least one passive device included in the matching circuit 200 may be determined by the impedance of the at least one passive device at the first frequency.

As illustrated in FIG. 5, the NFC controller 300 may include the NFC transmitter 310, the NFC receiver 320, and the NFC card 330. Referring to FIGS. 1 and 5, the NFC transmitter 310 may include a modulator that modulates data received from the host 30. The NFC transmitter 310 may output a modulated signal to the transmitter interface 210 of the matching circuit 200. The NFC transmitter 310 may further include an encoder that encodes data received from the host 30. The modulator modulates the encoded data output from the encoder.

The NFC receiver 320 may include a demodulator that demodulates a signal received from the receiver interface 220 of the matching circuit 200. The NFC receiver 320 may transmit a demodulated signal to the host 30. The NFC receiver 320 may further include a decoder that decodes data output from the demodulator, and transmit the decoded data output from the decoder to the host 30.

The NFC card 330 may store data related to payment information and output a signal based on the stored data to the card interface 230 of the matching circuit 200. A block such as the NFC card 330 which stores or processes data related to information to be protected is referred to as a secure element (SE). According to an embodiment of the inventive concept, the NFC controller 300 may be embodied as a semiconductor device and the SE may be included in the semiconductor device that is an embodiment of the NFC controller 300.

Figure 6:
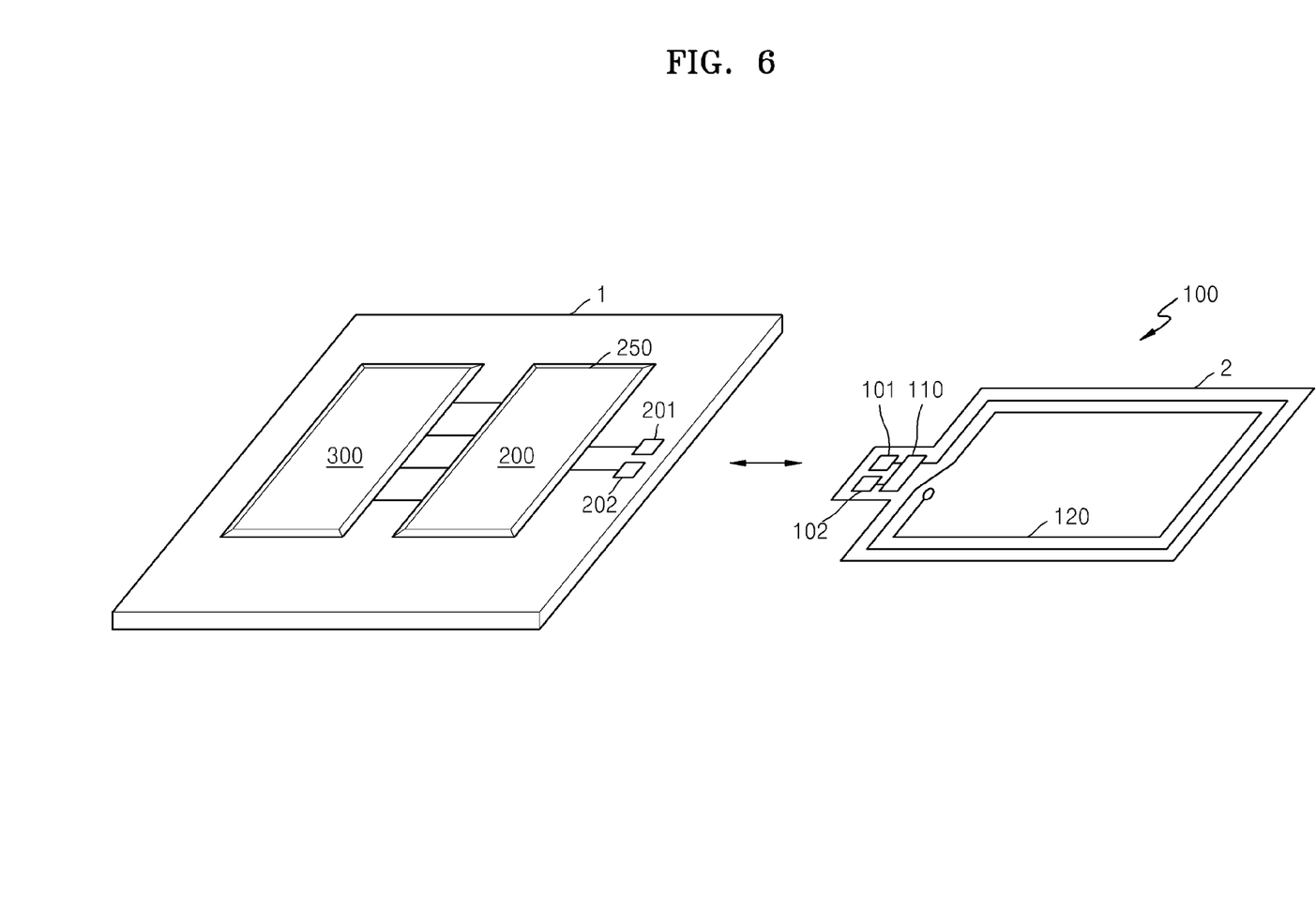
FIG. 6 is a diagram illustrating an application example of an NFC module according to an embodiment of the inventive concept.

FIG. 6 is a diagram illustrating an application example of the NFC module 10 according to an embodiment of the inventive concept. As described above with reference to FIG. 1, the NFC module 10 may include the antenna module 100, the matching circuit 200, and the NFC controller 300. Referring to FIG. 6, the matching circuit 200 and the NFC controller 300 may be mounted on a substrate 1 and connected to each other. The antenna module 100 may be manufactured separately from the matching circuit 200 and the NFC controller 300, and include a resonance unit 110, an antenna 120, a first terminal 101, and a second terminal 102 mounted on a substrate 2. The antenna module 100 and the matching circuit 200 may be connected to each other by connecting the first terminal 101 and the second terminal 102 exposed to the outside of the antenna module 100 to terminals 201 and 202 that are mounted on the substrate 1 and connected to the matching circuit 200.

According to an embodiment of the inventive concept, the substrate 1, on which the matching circuit 200 and the NFC controller 300 are mounted, may be a rigid printed circuit board (RPCB). The substrate 2, on which the resonance unit 110, the antenna 120, the first terminal 101, and the second terminal 102 of the antenna module 100 are mounted, may be a flexible PCB (FPCB). For example, not only the matching circuit 200 and the NFC controller 300 but also the host 30 of FIG. 1 may be mounted on the substrate 1, and the substrate 1 may be a multi-layer substrate. The antenna module 100 may be installed in space adjacent to an external surface of a communication device to establish wireless communication and has a simple circuit structure. Thus, the substrate 2 may be thin and flexible. According to various embodiments of the inventive concept, the terminals 201 and 202 on the substrate 1, and the first and second terminals 101 and 102 of the antenna module 100 may be electrically connected by soldering or by contacting each other through structures supporting the substrate 1 and the substrate 2.

The matching circuit 200 may include a semiconductor chip package 250. The semiconductor chip package 250 may encapsulate passive devices included in the matching circuit 200. As described above, the matching circuit 200 may be designed independently from the shape of the antenna 120 included in the antenna module 100, and thus, the passive devices that are included in the matching circuit 200 and the predetermined arrangements and values of the passive devices may be encapsulated by the semiconductor chip package 250.

Figure 7:
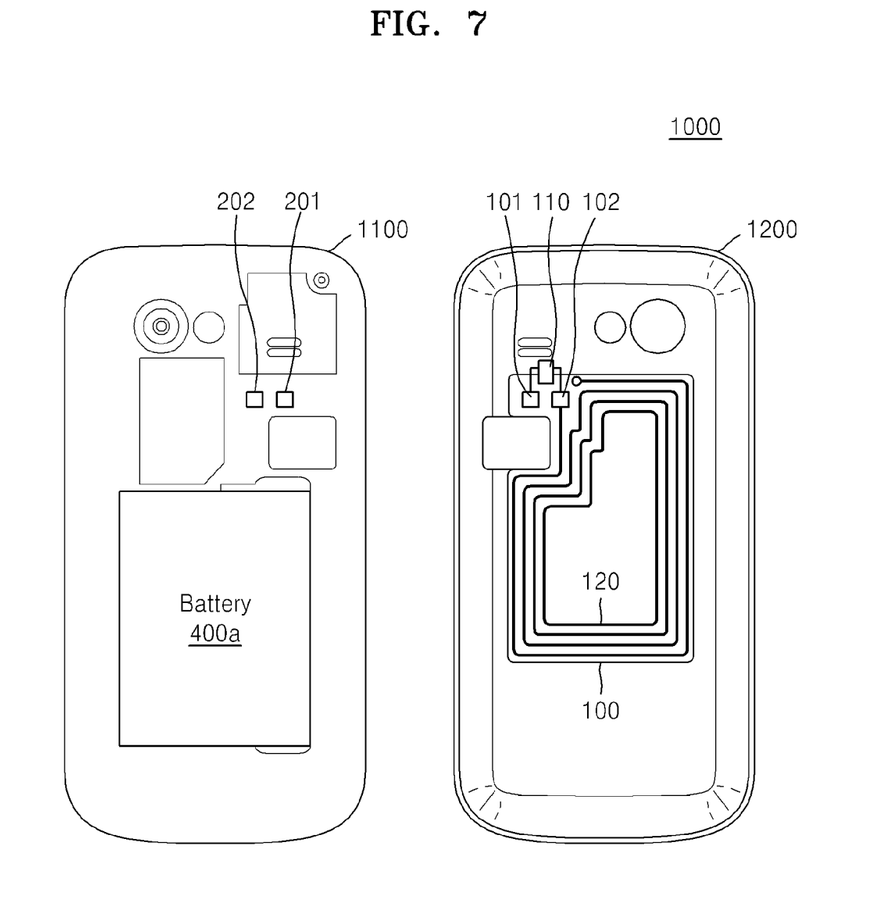
FIG. 7 is a diagram illustrating an application example of an antenna module according to another embodiment of the inventive concept.

FIG. 7 is a diagram illustrating an application example of the antenna module 100 according to an embodiment of the inventive concept. Referring to FIGS. 1 and 7, the NFC module 10 may be included in a mobile phone 1000. The mobile phone 1000 may exchange voice data, video data, or an address book with other mobile devices via the NFC module 10. An owner of the mobile phone 1000 may pay for goods or services to be provided via the NFC module 10 or use the NFC module 10 as a means for identifying himself or herself.

As illustrated in FIG. 7, the mobile phone 1000 may be divided into a body 1100 and a battery cover (or rear side cover) 1200. The body 1100 may include a battery 400a, and the substrate 1 illustrated in FIG. 1, on which the matching circuit 200 and the NFC controller 300 are mounted. The body 1100 may further include terminals 201 and 202 exposed to connect the matching circuit 200 and the antenna module 100.

As illustrated in FIG. 7, the antenna module 100 may be mounted on an inner surface of the battery cover 1200. The antenna module 100 may include a resonance unit 110, an antenna 120, a first terminal 101, and a second terminal 102. The first terminal 101 and the second terminal 102 are exposed to be electrically connected to the terminals 201 and 202 of the body 1100. When the battery cover 1200 is combined with the body 1100, the first terminal 101 and the second terminal 102 may contact each other to be electrically connected to each other. That is, in the current embodiment, the antenna module 100 may be detachable from the matching circuit 200.

As described above, wireless communication using NFC is established within a distance of 10 cm or less, and the distance between antennae communicating with each other may be required to be 10 cm or less. The antenna 120 may be located close to an edge of the mobile phone 1000, compared to other electronic parts, so that a magnetic field generated or induced by the antenna 120 may not distort. Thus, as illustrated in FIG. 7, the antenna module 100, including the antenna 120, may be installed on the inner surface of the battery cover 1200 of the mobile phone 1000. A user may establish wireless communication using NFC by bringing a rear surface of the mobile phone 1000 that is a combination of the body 1100 and the battery cover 1200 into contact or adjacent to another communication device supporting NFC.

According to an embodiment of the inventive concept, in the antenna module 100, the resonance unit 110 may be mounted on the battery cover 1200 together with the antenna 120. Thus, even if during a process of designing the mobile phone 1000, the shape of the battery cover 1200, on which the antenna module 100 is disposed, is changed and thus the inductance of the antenna 120 is changed, the design of the matching circuit 200 installed in the body 1100 may not be changed. That is, the matching circuit 200 may be designed independently from the antenna module 100.

Figure 8:
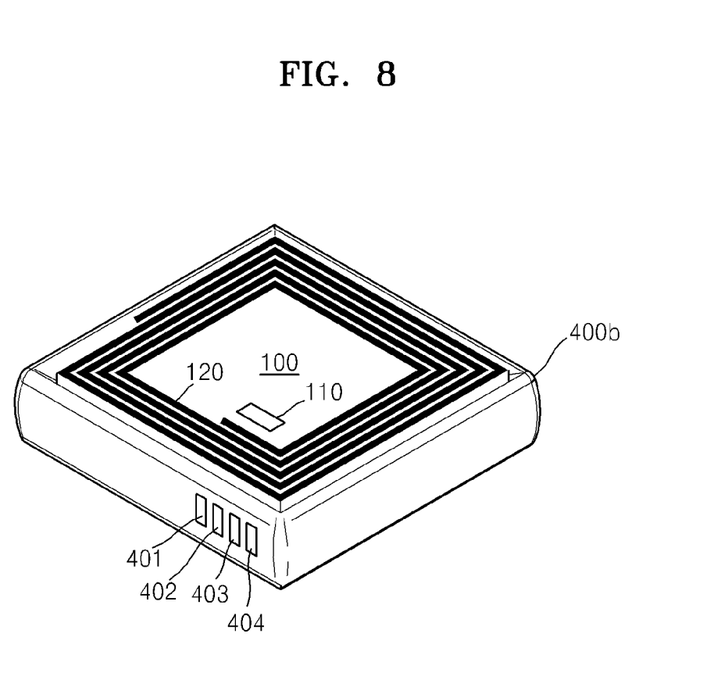
FIG. 8 is a diagram illustrating an application example of an antenna module according to another embodiment of the inventive concept.

FIG. 8 is a diagram illustrating an application example of the antenna module 100 according to another embodiment of the inventive concept. As illustrated in FIG. 8, the antenna module 100 may be installed in a battery 400b. The antenna module 100 may share terminals with the battery 400b. For example, as illustrated in FIG. 8, the antenna module 100 may use two terminals among terminals 401 to 404 of the battery 400b as a first terminal 101 and a second terminal 102 of the antenna module 100. For example, the antenna module 100 may use the terminals 402 and 403 of the battery 400b as the first terminal 101 and the second terminal 102, respectively. The battery 400b may be installed in a mobile electronic device, e.g., a mobile phone, a laptop computer, etc., and the battery 400b may provide power via the terminals 401 to 404.

Figure 9:
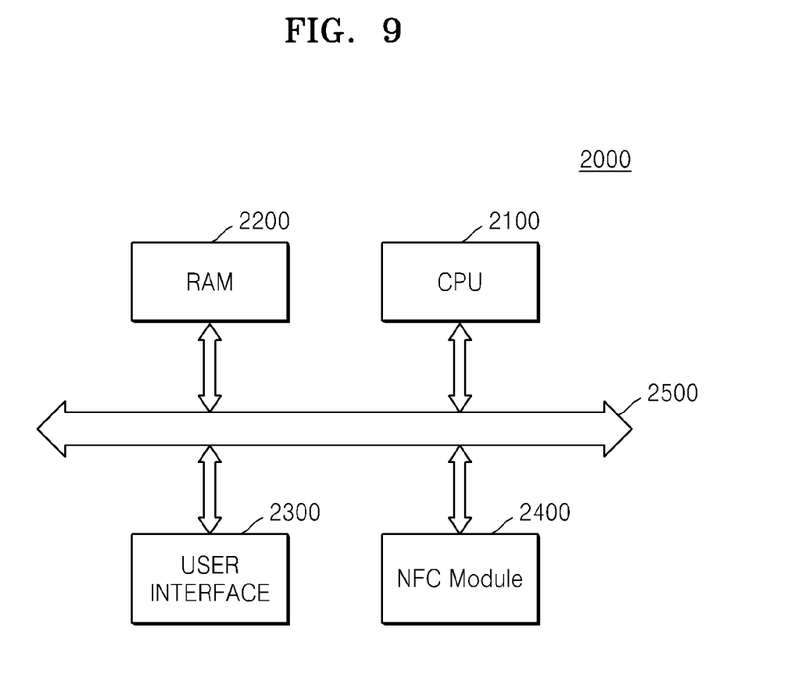
FIG. 9 is a block diagram of a computing system including an NFC module according to an embodiment of the inventive concept.

FIG. 9 is a block diagram of a computing system 2000 including an NFC module 2400 according to an embodiment of the inventive concept. The NFC module 2400 according to one of various embodiments of the inventive concept may be included in the computing system 2000 such as a mobile device, a desktop computer, or a server. The computing system 2000 according to an embodiment of the inventive concept may include a central processing unit (CPU) 2100, a random access memory (RAM) 2200, a user interface 2300, and the NFC module 2400 that may be electrically connected to a bus 2500.

The CPU 2100 may control the computing system 2000 and transmit data, which is to be transmitted to the outside of the computing system 2000 via the NFC module 2400, to the NFC module 2400 via the bus 2500. The RAM 2200 may function as a data memory of the CPU 2100 and include, for example, a dynamic RAM (DRAM). The user interface 2300 may receive a command from a user of the computing system 2000 or output a signal (e.g., voice or video data) for the user.

The NFC module 2400 may include an antenna module, a matching circuit, and an NFC controller as in the previous embodiment. The antenna module may include an antenna, a resonance unit, and first and second terminals. The antenna module may set a resonance frequency between the first and second terminals to be equal to a first frequency, and the resonance unit may be designed such that a resonance frequency of the antenna module is equal to the first frequency. The matching circuit may be connected to the first and second terminals of the antenna module, and the NFC controller. The matching circuit may change an impedance present between the antenna module and the NFC controller, and transmit a signal between the antenna module and the NFC controller. The NFC controller may receive or transmit data via the bus 2500. The NFC controller may encode and/or modulate data received via the bus 2500, demodulate and/or decode a signal received via the matching circuit, and transmit the demodulated and/or decoded signal via the bus 2500.

While the inventive concept has been particularly shown and described with reference to exemplary embodiments thereof, it will be understood that various changes in form and details may be made therein without departing from the spirit and scope of the following claims.

What is claimed is:

1. A near field communication (NFC) module comprising:
   an NFC controller including an NFC transmitter, an NFC receiver and an NFC card;
   a matching circuit including a transmitter interface connected to the NFC transmitter, a receiver interface connected to the NFC receiver and a card interface connected to the NFC card; and an antenna module including a first terminal, a second terminal, an antenna connected to the first and second terminals, and a resonance unit, the antenna module configured to be directly connectable to the matching circuit via the first and second terminals and detachable from the matching circuit, and the resonance unit integrated as part of the antenna module, wherein the resonance unit is connected to the first and second terminals and includes a first passive device, a value of the first passive device being such that a resonance frequency between the first and second terminals is in a predetermined frequency range.

2. The NFC module of claim 1, wherein the first passive device is a capacitor having a capacitance based on the resonance frequency and an inductance of the antenna.

3. The NFC module of claim 1, wherein the first and second terminals are exposed to an outside of the antenna module.

4. The NFC module of claim 3, wherein the antenna module is installed in a battery of a mobile communication device and uses two terminals among terminals of the battery as the first and second terminals.

5. The NFC module of claim 3, wherein the antenna module is installed on a battery cover of the mobile communication device.

6. The NFC module of claim 1, further comprising a flexible printed circuit board, and wherein the antenna and the first passive device are mounted on the flexible printed circuit board.

7. The NFC module of claim 1, wherein the resonance frequency is in a range of 13 MHz to 14 MHz.

8. A near field communication (NFC) module comprising:
an antenna module including a first terminal, a second terminal, an antenna connected to the first and second terminals, and a resonance unit;
a matching circuit including a plurality of passive devices; and
an NFC controller connected to the matching circuit,
wherein the antenna module is configured to resonate at a first frequency, to be directly connectable to the matching circuit, and to be detachable from the matching circuit,
the NFC controller is configured to output or receive a signal of a second frequency, and
the resonance unit is integrated as part of the antenna module and comprises a first passive device configured to have a value such that the first frequency is set regardless of the plurality of passive devices within the matching circuit.

9. The NFC module of claim 8, wherein values of the plurality of passive devices are based on an impedance at the first frequency.

10. The NFC module of claim 8, wherein the matching circuit comprises at least one terminal that contacts the antenna module, and the at least one terminal of the matching circuit is exposed to an outside of the matching circuit such that the antenna module is configured as detachably connected to the NFC module via the at least one terminal.

11. The NFC module of claim 8, wherein the NFC controller comprises a secure element configured to store data that is related to payment information and transmitted via the antenna module.

12. The NFC module of claim 8, wherein the matching circuit comprises a semiconductor chip package, and the semiconductor chip package encapsulates the plurality of passive devices.

13. The NFC module of claim 8, wherein the second frequency is 13.56 MHz, and the first frequency is in the range of 13 MHz to 14 MHz.

14. The NFC module of claim 8, wherein the first passive device is a capacitor having a capacitance based on the first frequency and an inductance of the antenna.

15. The NFC module of claim 8, further comprising a battery on which the antenna module is installed.

16. The NFC module of claim 15, wherein the antenna module shares the first terminal and the second terminal with the battery.

17. A system comprising:
a controller;
a memory; and
a near field communication (NFC) module comprising
an NFC controller including an NFC transmitter, an NFC receiver and an NFC card,
a matching circuit including a transmitter interface connected to the NFC transmitter, a receiver interface connected to the NFC receiver and a card interface connected to the NFC card,
an antenna module including a first terminal, a second terminal, an antenna connected to the first and second terminals, and a resonance unit, the antenna module is configured to be directly connectable to the matching circuit and detachable from the matching circuit, wherein the resonance unit is integrated as part of the antenna module, and
a battery on which the antenna module including the resonance unit is installed,
wherein the resonance unit is connected to the first and second terminals and includes at least one passive device,
the matching circuit includes at least one passive device, and
a value of the first passive device being such that a resonance frequency between the first and second terminals is in a predetermined frequency range.

18. The system of claim 17, wherein the antenna module shares the first terminal and the second terminal with the battery.

19. The system of claim 17, wherein the NFC controller receives data from a host.

20. The system of claim 17, wherein the antenna is a dual-loop antenna.

* * * * *